United States Patent [19]

Berndt et al.

[11] 3,879,383

[45] Apr. 22, 1975

[54] 2-HALOGEN-18-METHYL-1-ANDROSTENE

[75] Inventors: Hans-Detlef Berndt; Hermann Steinbeck; Rudolf Wiechert, all of Berlin, Germany

[73] Assignee: Schering Aktiengesellschaft, Berlin, Germany

[22] Filed: Aug. 26, 1969

[21] Appl. No.: 853,216

[30] Foreign Application Priority Data
Sept. 4, 1969  Germany.............................. 1793344

[52] U.S. Cl. ......... 260/239.55; 260/397.4; 424/243
[51] Int. Cl. ....................................... C07C 173/00
[58] Field of Search ...... /Machine Searched Steroids

[56]  References Cited
UNITED STATES PATENTS

| | | | |
|---|---|---|---|
| 2,851,454 | 9/1958 | Pappo et al..................... | 260/239.55 |
| 3,069,435 | 12/1962 | Wiechert et al................ | 260/397.4 |
| 3,455,972 | 7/1969 | Edwards et al................. | 260/397.4 |
| 3,467,652 | 9/1969 | Hughes et al.................. | 260/239.55 |
| 3,514,448 | 5/1970 | Laos.............................. | 260/239.55 |

OTHER PUBLICATIONS
Dferassi et al., JACS, Vol. 69, pp. 2404–2406, (1947).
Beereboom et al., J. Org. Chem., Vol. 19, pp. 1196–1197, (1954).
Applezweig, Steroid Drugs, p. 515, (1962).

*Primary Examiner*—Elbert L. Roberts
*Attorney, Agent, or Firm*—Michael S. Striker

[57]  ABSTRACT

An androstene steroid of the formula

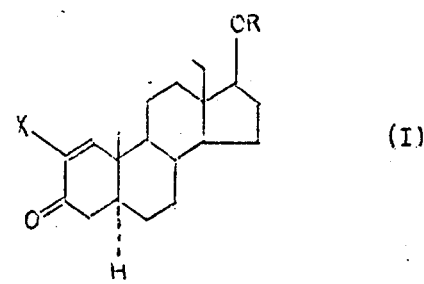

(I)

wherein R is hydrogen or an acid residue or a lower alkyl or tetrahydropyranyl group and wherein X is chlorine or bromine.

The compounds are useful for pharmaceutical use wherever an albumin build-up is desired. They have a superior anabolic action and a desirable dissociation of the anabolic from the androgenic effects.

5 Claims, No Drawings

2-HALOGEN-18-METHYL-1-ANDROSTENE

BACKGROUND OF THE INVENTION

Compounds having a strong anabolic action are well known. Such compounds are for instance 2-chloro-17β-acetoxy-5α-androst-1-ene-3-one and 17β-acetoxy-5α-androst-1-ene-3-one. However, these compounds, and in particular the second compound listed, have still an undesirably high androgenic action associated with the anabolic action.

It is therefore an object of the present invention to provide for compounds and pharmaceutical compositions made therewith that have a superior anabolic action without, or with a minimum of, undesirable androgenic action.

SUMMARY OF THE INVENTION

The invention accordingly relates to compounds of the formula

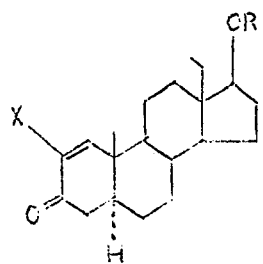

(I)

wherein R is hydrogen, an acid residue, a lower alkyl or tetrahydropyranyl group and wherein X is chlorine or bromine.

The invention also embraces pharmaceutical compositions in which the effective agent is a compound as defined.

The invention furthermore includes a process of making the compounds as stated, starting from a compound of the general composition

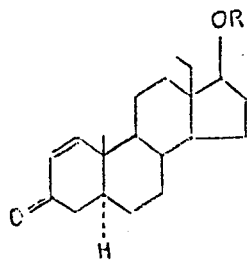

(IIa)

and treating this compound in an alkaline solution with hydrogen peroxide and then reacting the thus formed 1α,2α-epoxide steroid with halogen acid or by, alternatively, halogenating the just-given compound and splitting off the halogen acid from the thus-formed 1,2-dihalogeno compound or also subjecting the stated compound to an addition reaction with hypohalogenous acid (HOX) and splitting off from the formed halogenohydrin 1 mol of water.

In a still further process, the compound of the formula

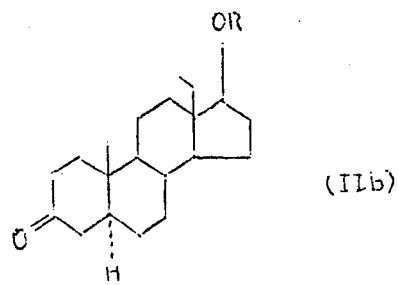

(IIb)

is subjected to halogenation and the halogen acid is then split off from the formed 2,2-dihalogeno compound.

DESCRIPTION OF THE PREFERRED EMBODIMENTS

The acid residues designated in the above formula of the compounds of the invention as R may be any acid residue which is derived from the organic or inorganic acids that are customarily employed in steroid chemistry for esterifications. Preferred are organic acids that have up to 15 carbon atoms, particularly lower and medium aliphatic carboxylic acids. The acids may furthermore also be unsaturated, branched, polycarboxylic acids or they may be substituted in the usual manner, for instance by hydroxyl or amino groups or halogen atoms. Suitable are also cycloaliphatic, aromatic, mixed aromatic-aliphatic or heterocyclic acids which in turn may again be substituted in conventional manner.

Preferred acids for formation of the acid residue are for instance the following: acetic acid, propionic acid, caproic acid, enanthic acid, undecylic acid, oleic acid, trimethylacetic acid, halogenoacetic acid, cyclopentylpropionic acid, phenylpropionic acid, phenylacetic acid, phenoxyacetic acid, dialkylaminoacetic acid, piperidinoacetic acid, succinic acid, benzoic acid, etc. Useful also are the conventional inorganic acids such as sulfuric and phosphoric acid.

As lower alkyl groups, the methyl, ethyl, propyl and butyl residues are preferred.

The invention also embraces a process for making the compounds of the above formula I, which comprises converting, in compounds of the formula II

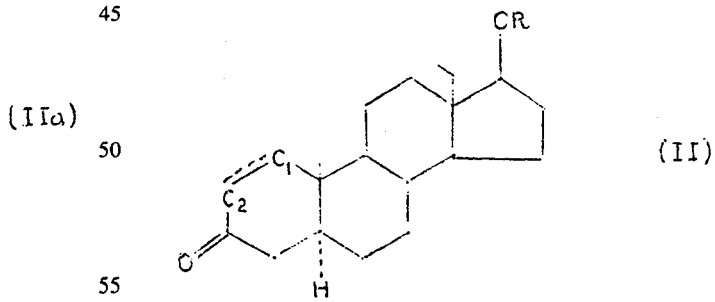

(II)

wherein R is as above, the group

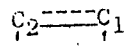

which is —CH$_2$—CH$_2$— or —CH=CH—, to the group —CX=CH— wherein X has the meaning as above given. Depending on the final group desired in R, the product may subsequently be esterified or etherified in the free hydroxyl group or an esterified or etherified hydroxyl group may be subjected to hydrolyzing.

The conversion of compounds of the general formula II into compounds of formula I may be effected, for instance, as follows.

The starting product may be a compound of the formula IIa.

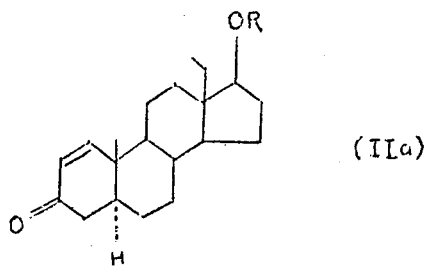

wherein R has the meaning as above given. These compounds accordingly already have a double bond in the 1,2-position. To these compounds there is then added by an addition reaction the halogen X or the hypohalogenous acid HOX in the 1,2-position, whereupon subsequently the hydrogen halide or water are split off while introducing the 1,2-double bond. The hypohalogenous acid preferably is liberated during the reaction from N-chloro- or N-bromo-succinimide or -acetamide. The splitting off of the water from the halogenohydrins can, for instance, be effected with HCl/glacial acetic acid. The hydrogen halide can also be split off from the 1,2-position of the 1,2-halogenosteroid which is obtained by the action of chlorine or bromine upon the compound by heating the steroid in the presence of an alkali halide and earth alkaline carbonate in dimethylformamide.

The preferred manner of making the compounds of the invention is, however, this: First, an epoxidation is effected of the $\Delta^1$-double bond and the thus-obtained $1\alpha,2\alpha$-epoxide is then reacted by means of a gaseous hydrogen halide so as to form $\Delta^1$-2-halogenosteroid. The epoxidation is carried out in conventional manner by reacting the $\Delta^1$-unsaturated steroid with hydrogen peroxide in an alkali medium.

It is also possible to use as starting compounds compounds of the formula IIb

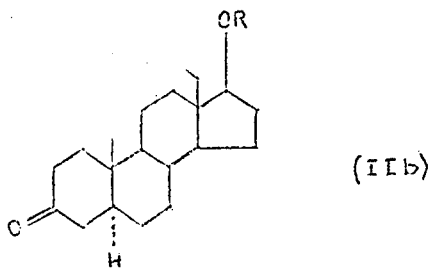

in which R again has the same meaning as above given. As is evident, these compounds are saturated in the 1,2-position. The two hydrogen atoms in this formula present in the 2-position can be substituted by chlorine or bromine and followed by splitting off of the hydrogen halide from the 1,2-position. The reactions can be carried out in conventional manner, for instance by dissolving the starting steroid in chloroform and/or acetic acid and reacting the solution with chlorine or bromine whereupon the 2,2-dihalogeno compound which is isolated in conventional manner is the treated with a base, for instance collidin at boiling point temperature in order to split off the hydrogen halide.

Depending upon the desired group which should be R in the final product an ester or ether group may then be hydrolyzed in the 17-position, or a free 17-hydroxy group may be esterified or etherified.

The esterification, etherification, and saponification reactions may be carried out in conventional manner. For instance, the esterification reaction may be carried out by reaction with acid anhydride or acid halide in the presence of an acidic or basic reagent, and the reaction with the desired acid may be performed in the presence of trifluoroacetic acid anhydride. In order to form the 17-tetrahydropyranylethers, it is possible to react the 17-hydroxy compounds with dihydropyran in the presence of an acid such as p-toluenesulfonic acid or in the presence of phosphorousoxy-chloride. The 17-alkylether is then obtained from the corresponding 17-hydroxy compound with alkylating reagents such as diazoalkane in the presence of $BF_3$-etherate or with an alkyl halide in the presence of a basic condensation agent such as silver oxide.

As already stated, the compounds of the invention have an excellent anabolic action and at the same time a fargoing dissociation of the desirable anabolic from the undesirable androgenic action.

The following table illustrates the excellent properties of the compounds of the invention using as example 2-chloro-17$\beta$-acetoxy-18-methyl-5$\alpha$-androst-1-ene-3-one.

The test results given in the table were obtained with castrated male rats (Sprague-Dawley) in the conventional Levator-ani/seminal vescicle test.

The administration was effected subcutaneously and the dose was 1 mg per animal. The weights of the organs, that is of the m. levator ani and the seminal vescicle are stated with reference to 100 g of body weight.

TABLE

| Compound | | Weight of Organs in mg/100 g of body weight: | |
|---|---|---|---|
| | | Levator ani: | Seminal Vescicle: |
| I | 2-chloro-17$\beta$-acetoxy--18-methyl-5$\alpha$--androst-1-ene-3-one | 48 | 21 |
| II | 2-chloro-17$\beta$-acetoxy--5$\alpha$-androst-1-ene-3--one | 41 | 49 |
| III | 17$\beta$-acetoxy-5$\alpha$-androst--1-ene-3-one | 51 | 415 |

The Table clearly illustrates that the compound I is distinguished over the other well-known strong anabolics II and III by the fact that it possesses a high anabolic action with only minor androgenic side-effects.

The new agents can be incorporated in pharmaceutical compositions which may be used in all cases where a build-up of the albumin is desirable or necessary. Conditions and diseases where this is indicated may, among others, be the following: conditions of convalesence, generally run-down condition, consumptive (in a broad sense) diseases, anemia (to promote erythropoiesis), long-tern treatments with corticoids, osteoporosis, chronic liver and kidney diseases, acute failure of the kidneys, hyperthyreosis, muscular dystrophy, diabetic retinopathy, poorly developing dystrophic infants, abnormal growth problems, etc.

The pharmaceutical compositions can be made with the conventional carrier materials as used in galenic pharmacy to form anabolically active, particularly parenteral but also orally administrable, be it intramuscular or subcutaneous, pharmaceuticals. The dose depends on the gravity of the illness. In general it should be between about 1 and 50 mg per day.

Among the compounds of the invention it has been found that the compounds wherein an ester is present and the ester residue is derived from a higher fatty acid are particularly suitable because of their protracted effects in making delayed-action compositions.

Examples of the pharmaceutical compositions are the following:

1. Tablets with a content of 5 mg 2-chloro-17β-acetoxy-18-methyl-5α-androst-1-ene-3-one, each:

Composition for 1 tablet:

| | |
|---|---|
| 5.000 mg | 2-chloro-17β-acetoxy-18-methyl-5α-androst-1-ene-3-one |
| 105.000 mg | lactose (DAB 6) |
| 8.000 mg | corn starch (USP XVI) |
| 1.000 mg | magnesium stearate (USP XVI) |
| 1.000 mg | talcum (DAB 6) |
| 120.000 mg. | |

The tablets were formed in conventional manner on a tabletting machine. Their diameter was 7 mm (notched) and their height 2.7 to 2.8 mm.

The hardness was about 4–5 kg and decomposition in the gastric juice occurred at 37°C in about 15 seconds.

2. Capsules with a contents of 1 mg each of 2-chloro-17β-acetoxy-18-methyl-5α-androst-1-ene-3-one.

Composition for one capsule:

| | |
|---|---|
| 1.000 mg | 2-chloro-17β-acetoxy-18-methyl-5α-androst-1-ene-3-one |
| 66.500 mg | lactose (DAB 6) |
| 67.500 mg | |

The compound as is customary was put in hard gelatin telescoping capsules.

3. Oily solutions in ampoules for intramuscular injection.

a. 1 ml contains 20 mg of 2-chloro-17β-acetoxy-18-methyl-5α-androst-1-ene-3-one. The just-named effective agent in an amount of 2 g is dissolved in sesame oil and brought up to 100 ml. The solution was filled in ampoules holding 1 ml each and was sterilized for 1 hour at 120°C.

b. 1 ml contains 50 mg of 2-chloro-17β-acetoxy-18-methyl-5α-androst-1-ene-3-one. The 5 g of this compound was dissolved in castor oil/benzylbenzoate (6:4) ad 100 ml. The solution was then filled in ampoules holding 1 ml each and was sterilized in conventional manner.

STARTING PRODUCTS

Since the starting products have not as yet been described in the literature, the following is an example of their formation. Preferably, they are made from 18-methyl-4-androstene-3-one of the general formula

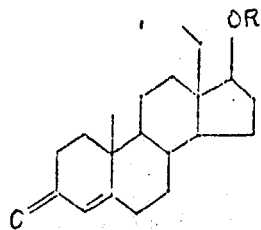

(III)

wherein R has the meaning as given. These compounds were subjected to hydrogenation of the 4-5-double bond and, if desired, there was subsequently a double bond introduced in conventional manner into the 1,2-position.

The hydrogenation of the 4–5-double bond preferably is effected by means of lithium in liquid ammonia. Compared with other hydrogenation methods, this approach leads to a maximum yield of the desired 5α-H-compound. The introduction of the double bond into the 1–2-position preferably is effected by first introducing a halogen atom, for instance bromine, and subsequently splitting the hydrogen halide off again. The dehydrogenation can also be carried out by means of selenium dioxide or dicyanodichlorobenzoquinone or by means of a suitable microbiological process.

PROCESS OF MAKING THE COMPOUNDS OF THE INVENTION

The following examples illustrate the making of the compounds of the invention.

EXAMPLE 1

3 g of 17β-hydroxy-18-methyl-5α-androst-1-ene-3-one. (m.p. 148°–149°C) were dissolved in 50 ml of methanol. Upon cooling by ice 1 ml of a 10% solution of sodium hydroxide and of a 3.5 ml 30% solution of hydrogen peroxide were added to this initial solution. After a reaction time of 10 minutes at a temperature of 0°C the product obtained was precipitated by pouring into water, was removed by filtration, washed with water, and concentrated to dryness in a vacuum at 50°C. The compound was then recrystallized from methanol and there were obtained 2.7 g of 17β-hydroxy-1α,2α-epoxy-18-methyl-5α-androstane-3-one with a melting point between 103° and 105°C.

Dry hydrogen chloride was then passed for 2 hours at room temperature into a solution of 1 g of this compound, 17β-hydroxy-1α, 2α-epoxy-18-methyl-5α-androstane-3-one, in 20 ml chloroform. The chloroform solution was subsequently washed with water, aqueous sodium bicarbonate solution and again water until neutral, was then dried over sodium sulfate and concentrated in vacuum to dryness.

After recrystallization of the evaporation residue from diisopropylether there was obtained 0.89 g of 2-chloro-17β-hydroxy-18-methyl-5α-androst-1-ene-3-one with a melting point of 176°–177°C.

UV (methanol): $\epsilon_{248} = 8200$ (crystals still contain solvent).

EXAMPLE 2

3.5 g of 17β-acetoxy-18-methyl-5α-androst-1-ene-3-one (m.p. 129°–130.5°C) were dissolved in 60 ml methanol and reacted upon cooling by ice with a 1 ml 10% sodium hydroxide solution and 4 ml of 30% hydrogen peroxide for a period of 10 minutes. The reaction product was then precipitated by pouring into ice water, removed by filtration followed by washing of the filtrate with water and drying in a vacuum at 50°C.

After recrystallization from diisopropylether, there were obtained 3.1 g of 17β-acetoxy-1α, 2α-epoxy-18-methyl-5α-androstane-3-one with a melting point of 157°–158°C.

3 g of 17β-acetoxy-1α, 2α-epoxy-18-methyl-5α-androstane-3-one were dissolved in 50 ml chloroform. Dry hydrogen chloride was passed at room temperature for 2 hours into this solution. The reaction solution was then washed successively with water, aqueous sodium bicarbonate solution and again with water, was dried over sodium sulfate and concentrated to dryness in a vacuum. The evaporation residue was recrystallized from hexane-acetone and there obtained 2.8 g of 2-chloro-17β-acetoxy-18-methyl-5α-androst-1-ene-3-one with a melting point of 156°–157°C.

UV (methanol): $\epsilon_{248} = 9310$.

EXAMPLE 3

200 mg 2-chloro-17β-hydroxy-18-methyl-5α-androst-1-ene-3-one were reacted overnight at room temperature as a solution in 0.8 ml abs. pyridine with 0.4 ml propionic acid anhydride. The reaction solution was concentrated in an oil pump vacuum to dryness, and the residue was crystallized from diisopropylether. There were thus obtained 120 mg of 2-chloro-17β-propionyloxy-18-methyl-5α-androst-1-ene-3-one having a melting point of 135°–136°C.

UV (methanol): $\epsilon_{248} = 9240$.

EXAMPLE 4

A solution of 200 mg of 2-chloro-17β-hydroxy-18-methyl-5α-androst-1-ene-3-one and 0.4 ml n-heptyl acid anhydride were left standing for 16 hours at room temperature. The reaction product was then precipitated by pouring into ice water and was taken up in diethylether. The organic phase was thereupon washed with aqueous sodium bicarbonate solution and water and was dried over sodium sulfate. After evaporation of the solvent, there were obtained 2-chloro-17β-heptanoyloxy-18-methyl-5α-androst-1-ene-3-one in the form of an oil.

UV (methanol): $\epsilon_{246} = 7000$.

EXAMPLE 5

360 mg of 17β-acetoxy-1α, 2α-epoxy-18-methyl-5α-androstane-3-one were dissolved in 7 ml acetic acid and reacted with 0.5 ml hydrogen bromide in glacial acetic acid (36.7 wt.-% HBr). After a reaction time of 10 minutes at room temperature the product was precipitated by pouring into ice water and was taken up in methylene chloride. The organic phase was then washed with aqueous sodium bicarbonate solution and water and was dried over sodium sulfate. After concentration of the solvent and recrystallization of the residue for hexane/acetone, there were obtained 240 mg of 2-bromo-17β-acetoxy-18-methyl-5α-androst-1-ene-3-one with a melting point of 136°–137°C.

UV (methanol): $\epsilon_{255} = 8100$.

EXAMPLE 6

100 mg of 2-chloro-17β-hydroxy-18-methyl-5α-androst-1-ene-3-one dissolved in 40 ml abs. benzene were reacted in the presence of 8 mg anhydrous p-toluenesulfonic acid with 0.03 ml of freshly distilled dihydropyran at room temperature. After 1 hour, the benzene solution was washed with aqueous sodium bicarbonate solution and water, was dried over sodium sulfate, and concentrated to dryness. There were obtained 2-chloro-17β-tetrahydropyranyloxy-18-methyl-5α-androst-1-ene-3-one in the form of an oil. $[\alpha]_D^{24°} = +25°$ ($c = 0.5$, chloroform).

UV (methanol): $\epsilon_{245} = 7380$.

EXAMPLE 7

346 mg of 17β-acetoxy-18-methyl-5α-androstane-3-one (m.p. 158.5°–159.5°C) were dissolved in 5 ml chloroform and 5 ml acetic acid. At 20°C there were first added 72 mg of chlorine in 2 ml acetic acid and after 30 minutes another portion 72 mg chlorine in 2 ml acetic acid. After 16 hours at room temperature the reaction product was precipitated by pouring it into ice water and was taken up in chloroform. The chloroform solution was washed successively with water, aqueous sodium bicarbonate solution and water, and was then dried over sodium sulfate and concentrated to dryness in a vacuum.

The evaporation residue was taken up in 10 ml of freshly distilled collidin and the solution was brought to boiling for 30 minutes upon reflux under an atmosphere of nitrogen. The solvent was thereupon evaporated in a vacuum and the residue was dissolved in methylene chloride. The methylene chloride phase was washed successively with 1 N HCl, water, aqueous sodium bicarbonate solution and water, and was dired over sodium sulfate and concentrated to dryness.

The product was then acetylated by reacting the evaporation residue with 2 ml of abs. pyridine and 1 ml of acetic anhydride at room temperature for a period of 16 hours. The reaction solution was concentrated in vacuum to dryness, subjected to chromatography on 50 g silicic acid with hexane-acetic acid ester (8:2). There was thus obtained 20 mg of 2-chloro-17β-acetoxy-18-methyl-5α-androst-1-ene-3-one with a melting point of 154°–156°C.

UV (methanol): $\epsilon_{248} = 9200$.

We claim:
1. A 2-halogeno-18-methyl-1-androstene having the formula I

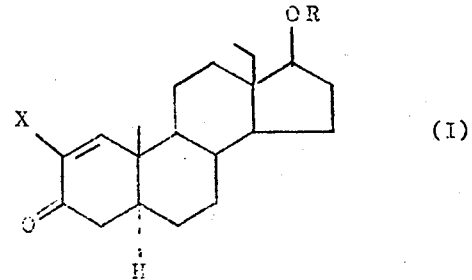

(I)

wherein R is hydrogen or an aliphatic acid group containing up to 15 carbon atoms and X is chlorine.

2. The compound of claim 1, which is 2-chloro-17β-hydroxy-18-methyl-5α-androst-1-ene-3-one.

3. The compound of claim 1, which is 2-chloro-17β-acetoxy-18-methyl-5α-androst-1-ene-3-one.

4. The compound of claim 1, which is 2-chloro-17β-propionyloxy-18-methyl-5α-androst-1-ene-3-one.

5. The compound of claim 1, which is 2-chloro-17β-heptanoyloxy-18-methyl-5α-androst-1-ene-3-one.

* * * * *